US012710131B2

(12) United States Patent
Thorat et al.

(10) Patent No.: US 12,710,131 B2
(45) Date of Patent: Aug. 18, 2026

(54) ATTACHMENT DEVICE FOR WOODEN I-JOIST/LUMBER

(71) Applicant: Eaton Intelligent Power Limited, Dublin (IE)

(72) Inventors: Hemraj Keda Thorat, Pune (IN); Sagar Ashok Patil, Pune (IN); Jason Sabel, Northborough, MA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 724 days.

(21) Appl. No.: 17/376,886

(22) Filed: Jul. 15, 2021

(65) Prior Publication Data

US 2022/0018494 A1 Jan. 20, 2022

Related U.S. Application Data

(60) Provisional application No. 63/053,167, filed on Jul. 17, 2020.

(51) Int. Cl.
*F16M 13/02* (2006.01)

(52) U.S. Cl.
CPC .................................. *F16M 13/02* (2013.01)

(58) Field of Classification Search
CPC ...... F16B 2/02; F16B 2/04; F16B 2/06; F16B 7/04; F16B 7/046; F16B 7/0433
USPC ......... 248/229.2, 229.4, 228.1, 228.5, 228.6, 248/229.1, 229.14; 52/695, 697
See application file for complete search history.

(56) References Cited

U.S. PATENT DOCUMENTS 2,106,084 A * 1/1938 Coddington .......... E04B 1/2403 52/655.1
3,085,148 A * 4/1963 Mcconnell ........... B23K 11/002 219/79
6,243,998 B1 * 6/2001 MacKarvich ....... E04B 1/34352 52/167.3
6,381,907 B1 * 5/2002 MacKarvich ....... E04B 1/34352 52/126.6
6,505,447 B1 * 1/2003 Oliver ..................... E02D 27/01 52/741.15
8,161,707 B2 * 4/2012 Simmons .................. F16B 7/22 403/252
9,145,701 B2 9/2015 Satoh et al.
9,206,594 B1 * 12/2015 Grevious .............. F16B 7/0486
10,907,343 B1 * 2/2021 Mou ......................... E04C 3/36
11,638,984 B2 * 5/2023 Gunn ...................... B25B 5/006 403/345
2004/0079034 A1 * 4/2004 Leek ..................... E04B 1/2608 52/713

(Continued)

FOREIGN PATENT DOCUMENTS

GB 631700 A 11/1949
JP 2002081133 A 3/2002
JP 2003193562 A 7/2003

(Continued)

OTHER PUBLICATIONS

International Search Report and Written Opinion from counterpart PCT Application No. PCT/EP2021/025264, dated Oct. 18, 2021, 14 pages.

*Primary Examiner* — Alfred J Wujciak
(74) *Attorney, Agent, or Firm* — Stinson LLP

(57) ABSTRACT

An attachment device for attaching to a structural component of a building to couple a fitting to the structural component.

20 Claims, 18 Drawing Sheets

(56) References Cited

U.S. PATENT DOCUMENTS

| | | | | |
|---|---|---|---|---|
| 2006/0091372 | A1* | 5/2006 | Rosian | E04F 11/1817 256/65.01 |
| 2009/0188185 | A1* | 7/2009 | Studebaker | F16B 5/0275 52/252 |

FOREIGN PATENT DOCUMENTS

| | | | |
|---|---|---|---|
| JP | 2005240423 | A | 9/2005 |
| JP | 2010222802 | A | 10/2010 |

* cited by examiner

ATTACHMENT DEVICE FOR WOODEN I-JOIST/LUMBER

REFERENCE TO RELATED APPLICATIONS

This application claims the benefit of U.S. Provisional Application No. 63/053,167, filed Jul. 17, 2020, the entire contents of which are incorporated herein by reference.

FIELD OF THE DISCLOSURE

The present disclosure generally relates to attachment devices for attaching to a structural component of a building.

BACKGROUND OF THE DISCLOSURE

Seismic supporting systems are used to support non-structural components (e.g., pipes) in a building. Seismic supporting systems typically include seismic sway braces and restraints. Sway braces and restraints are used to secure non-structural components to a building and minimize the differential movement between the non-structural components and the structural component and/or building itself. Examples of non-structural components in a building include, but are not limited to, pipes, conduits, round ducts, fittings, cable trays, etc. An attachment device attaches to a structural element of the building (e.g., a joist/lumber) and the sway brace or restraint, thereby securing the non-structural component to the building.

SUMMARY OF THE DISCLOSURE

The present disclosure relates to an attachment device for attaching to a structural component of a building to couple a fitting to the structural component, the attachment device comprising a plate member configured to be attached directly to the structural component, the plate member including a planar portion configured for engagement with the structural component and a raised portion spaced from the planar portion and configured to be engaged by the fitting to mount the fitting to the attachment device for coupling the fitting to the structural component.

A further aspect of the present disclosure is an attachment device assembly for attaching to a structural component of a building to couple a fitting to the structural component, the attachment device assembly comprising an attachment device configured to be attached directly to the structural component, the attachment device comprising a plate member defining a fastener opening; and a fastener configured to be received in the fastener opening for attaching the attachment device to the structural component, wherein the fastener comprises a wood screw such that the attachment device is configured to be attached to the structural component without using bolts through preformed holes in the structural component.

BRIEF DESCRIPTION OF THE DRAWINGS

Corresponding reference characters indicate corresponding parts throughout the drawings.

DETAILED DESCRIPTION OF THE DISCLOSURE

Overall, the attachment devices of the various embodiments described herein are for attaching to a structural component. The attachment devices can be secured to any structural element of a building such as a beam, floor, ceiling, for example. In the illustrated embodiment, the attachment devices are secured to I-joists. Any suitable restraint or sway brace, such as a longitudinal or lateral sway brace/restraint may be attached to the attachment device to secure a non-structural component to the structural component. The various attachment devices are each configured to securely attach to the structural component (i.e., I-joist/lumber) and provide a raised attachment location for mounting a fitting to the attachment device. Thus, the attachment devices are configured to mount the fittings at a location which do not interfere with the surrounding parts of the structural component. Additionally, one or more of the attachment devices provide for attachment to the structural component without forming pre-drilled holes through the structural component. Therefore, the attachment devices are configured to maintain the strength and integrity of the structural component after attachment to the structural component.

Figure 1:
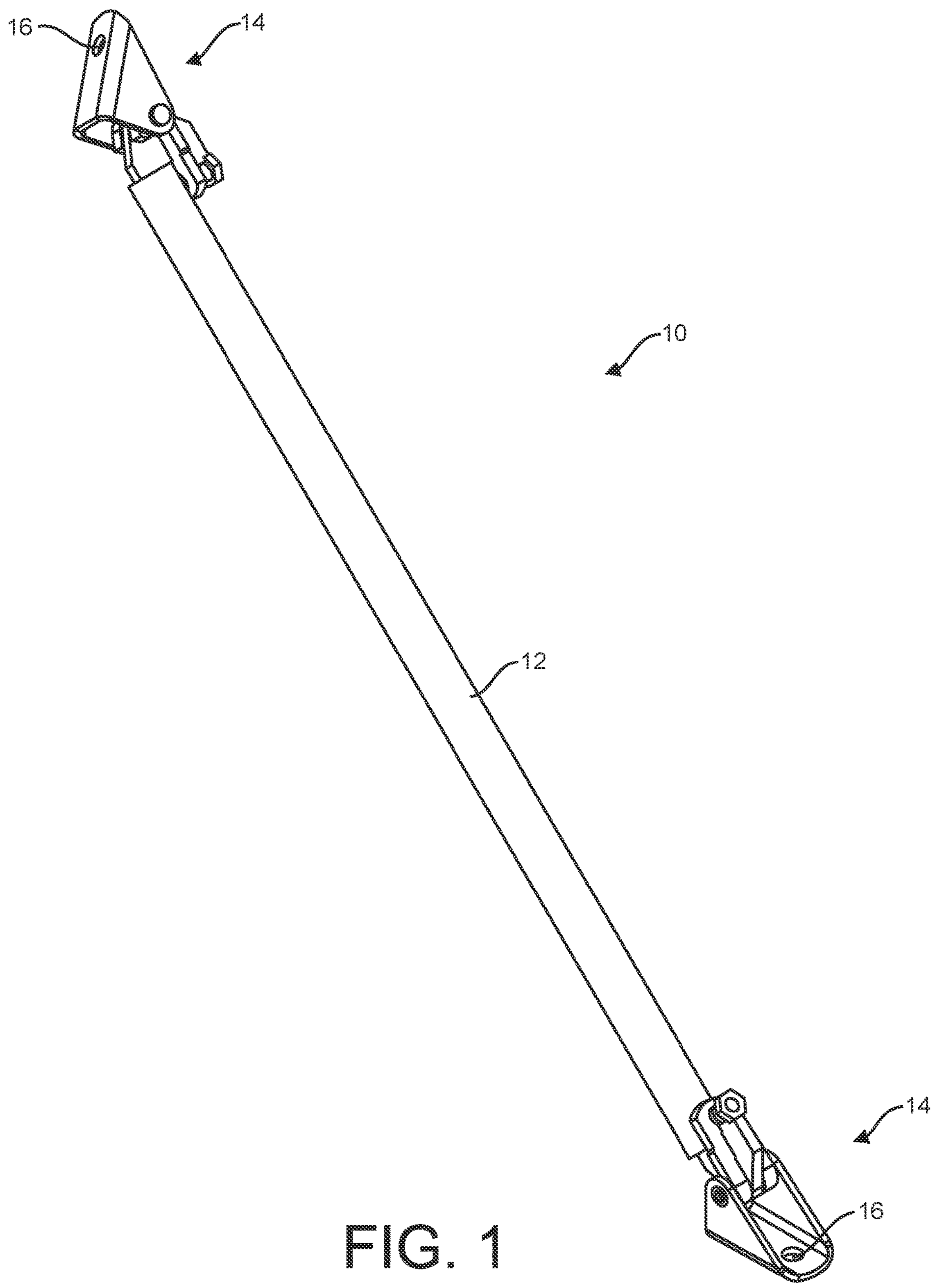
FIG. 1 is a perspective of one example of a sway brace/restraint that can be used with attachment devices of the present disclosure.

Referring to FIG. 1, one example of a suitable sway brace or restraint that can be used with the various attachment devices described below is generally indicated at reference numeral 10. As generally known in the art, the sway brace/restraint 10 includes a strut 12 (e.g., pipe, bar, rod, etc.) and opposite connection fittings 14 at each end of the strut. One connection fitting 14 may be used to attach the sway brace/restraint 10 to a structural component (e.g., I-joist of a building) and the opposite connection fitting 14 can be used to attach the sway brace/restraint to a non-structural component (e.g., pipes, conduits, round ducts, fittings, etc.). When the attachment device is coupled to the non-structural component, the sway brace/restraint spans between the structural component and the non-structural component, thereby supporting the non-structural component in the building. In the illustrated embodiment, each of the connection fittings 14 are identical and define a fastener opening 16 that can be used to connect the connection fitting to any one of the various attachment devices, as described in more detail below. It is understood that the sway brace/restraint 10 in FIG. 1 is illustrative and that the various attachment devices of the present disclosure may be used with any suitable sway brace/restraint. For example, the sway brace/restraint may be a seismic sway brace/restraint. Furthermore, it is contemplated that any one of the various attachment devices described below may be directly connected to the strut 12 of the sway brace/restraint 10 (e.g., replace one of the connection fittings 14 at one end of the strut 12), as is generally known in the art.

Figure 2:
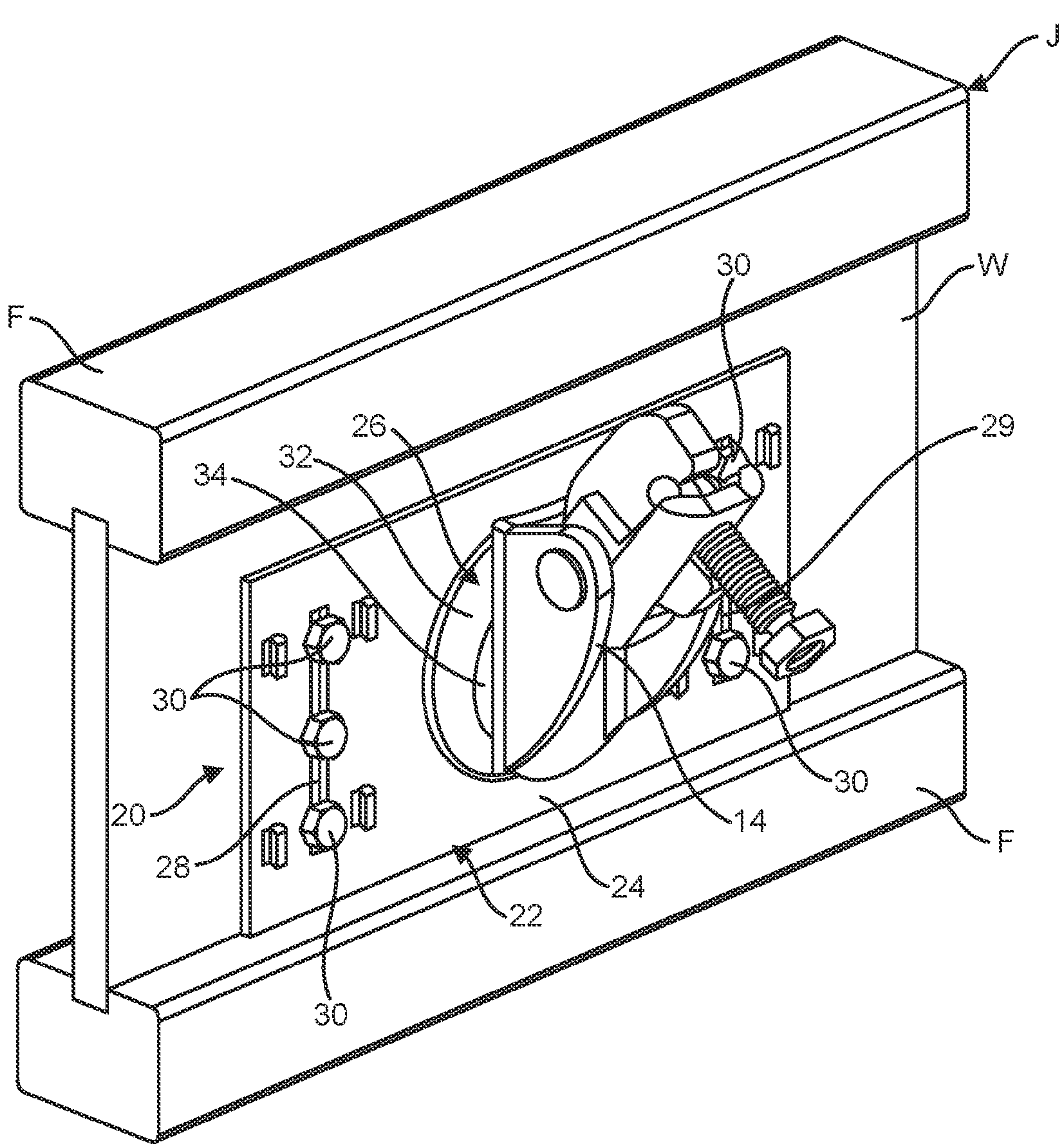
FIG. 2 is a perspective of a first embodiment of an attachment device attached to a structural component according to the teachings of the present disclosure.
Figure 3:
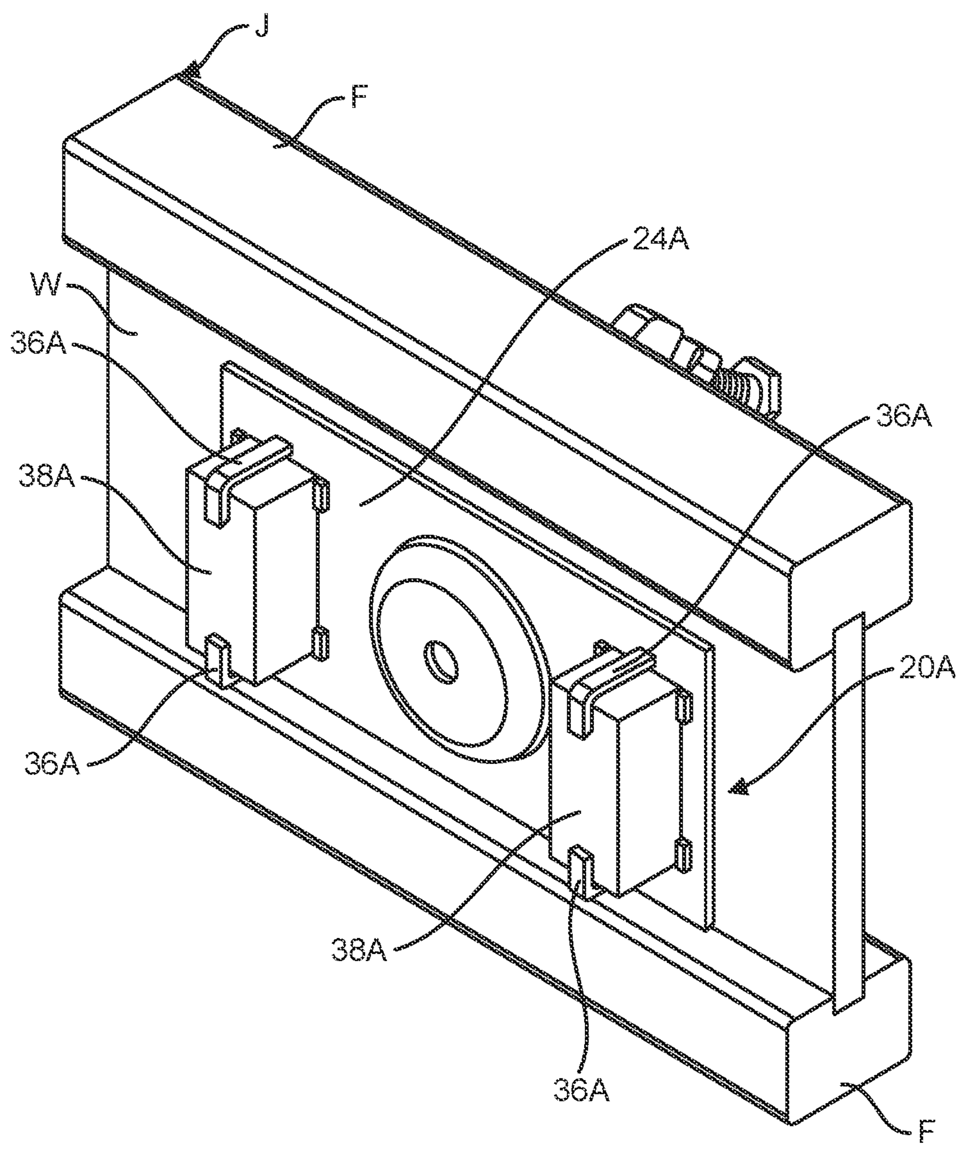
FIG. 3 is a perspective of a second attachment device attached to the structural component.
Figure 4:
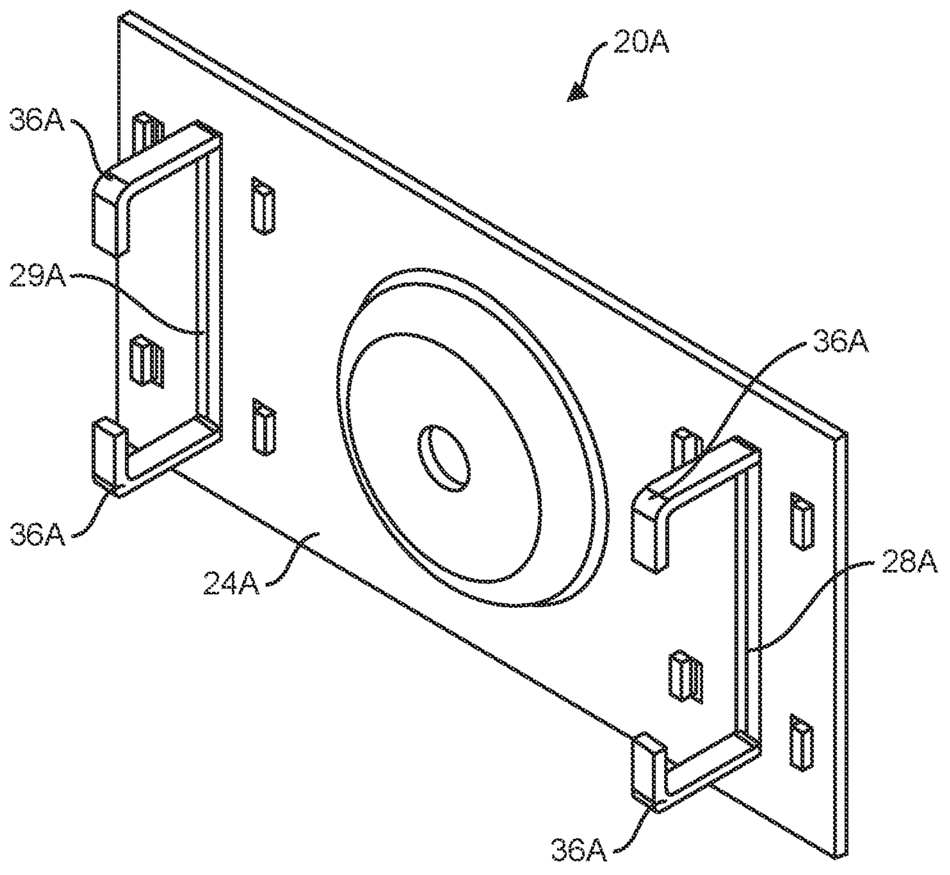
FIG. 4 is a perspective of the second attachment device.

Referring to FIGS. 2-4, a first embodiment of an attachment device for coupling to a structural component, is generally indicated at reference numeral 20. As shown in FIG. 2, attachment device 20 is configured to be attached to a structural component, such as a wooden I-joist J, and to a connection fitting 14 for attachment to a suitable sway brace restraint, or the like. The attachment device 20 includes a body or plate member 22 configured to be attached to a web W of the joist J. The plate member 22 has a planar portion 24 and a raised portion 26. The planar portion 24 provides a contact surface for engaging the web W of the joist J. In the illustrated embodiment, the attachment device 20, and particularly the plate member 22, has a rectangular shape. However, the attachment device 20 could be formed in any suitable shape such as round or oblong without departing from the scope of the disclosure. A pair of slots in the plate member 22 extends along a height of the attachment device 20 between a top and bottom of the attachment device. A first slot 28 is disposed adjacent a first longitudinal end of the attachment device 20 and a second slot 29 is disposed adjacent a second longitudinal end of the attachment device. In the illustrated embodiment, each slot 28, 29 includes a continuous slot. However, each of the slots 28, 29 could comprises a plurality of discrete slots spaced apart along the height and/or length of the plate member 22. One or more fasteners 30 are received in the slots 28, 29 for securing the attachment device 20 to the web W of the joist J. In one embodiment, the fasteners 30 are self-tapping wooden screws that are configured to be drive into the wooden joist J. Thus, pre-drilled holes for receiving standard bolts are not formed in the joist J.

The raised portion 26 is disposed within an interior of the planar portion 24 such that the raised portion is surrounded on all sides by the planar portion. In the illustrated embodiment, the raised portion 26 comprises a circular projection including a curved circumferential edge 32 projecting away from the planar portion 24, and a planar engagement surface 34 bounded by the circumferential edge. Thus, the planar engagement surface 34 is located within a plane that is spaced away from the plane of the planar portion 24 along a direction extending orthogonally to both planes. A hole (not shown) is configured to receive a fastener (not shown) for attaching the fitting 14 to the attachment device 20. Therefore, the fitting 14 is spaced away from the web W of the joist J a sufficient amount to prevent the fitting from being engaged by the flange F. This allows the fitting 14 to be attached to the attachment device 20 in any desired angular orientation. The fitting 14 is also able to be attached to the attachment device 20 without making a through hole in the web W of the joist J. While the raised portion 26 is shown as a circular projection, it will be understood that the raised portion could have other configurations without departing from the scope of the disclosure.

The attachment device 20 may be considered a first attachment device, and is configured for attachment to a first face of the web W of the joist J. Referring to FIGS. 3 and 4, a second attachment device 20A is configured for attachment to an opposite face of the web W of the joist J. The second attachment device 20A is substantially similar to the first attachment device 20. However, in addition to slots 28A, 29A, the second attachment device 20A includes hook members 36A disposed at each end of the slots. Each hook member 36A included a first arm extending orthogonally from planar portion 24A, and a second arm extending generally parallel to the planar portion. Block members 38A are retained to the second attachment device 20A by the hook members 36A. In particular, the block members 38A have a height extending parallel to the planar portion 24A and a thickness extending perpendicular to the planar portion 24A such that the block members are sized and shaped to be received within the space formed by the hook members 36A and the planar portion 24A. Thus, the first arms of the hook members 36A engage top and bottom sides, respectively, of the block members 38A, and the second arms of the hook members engage outwardly facing surfaces of the block member to hold and retain the block members to the second attachment device 20A. In one embodiment, the block members 38A comprise a wood, plastic, or composite material. Still other materials for the block members are envisioned.

When the fasteners 30 are inserted through the slots 28, 29 in the first attachment device 20, they will pass through the web W of the joist J, through the slots 28A, 29A in the second attachment device 20A, and into the block members 38A. Therefore, the self-tapping wooden screws 30 are anchored in the block members 38A. The fastening engagement between the fasteners 30 and the block members 38A secures both the first and second attachment devices 20, 20A to the web W of the joist J. Additionally, the block members 38A are thicker than the web W of the joist J and thus provide a more robust and mechanically sound structure for receiving the fasteners than just using the web W of the joist J.

Figure 5:
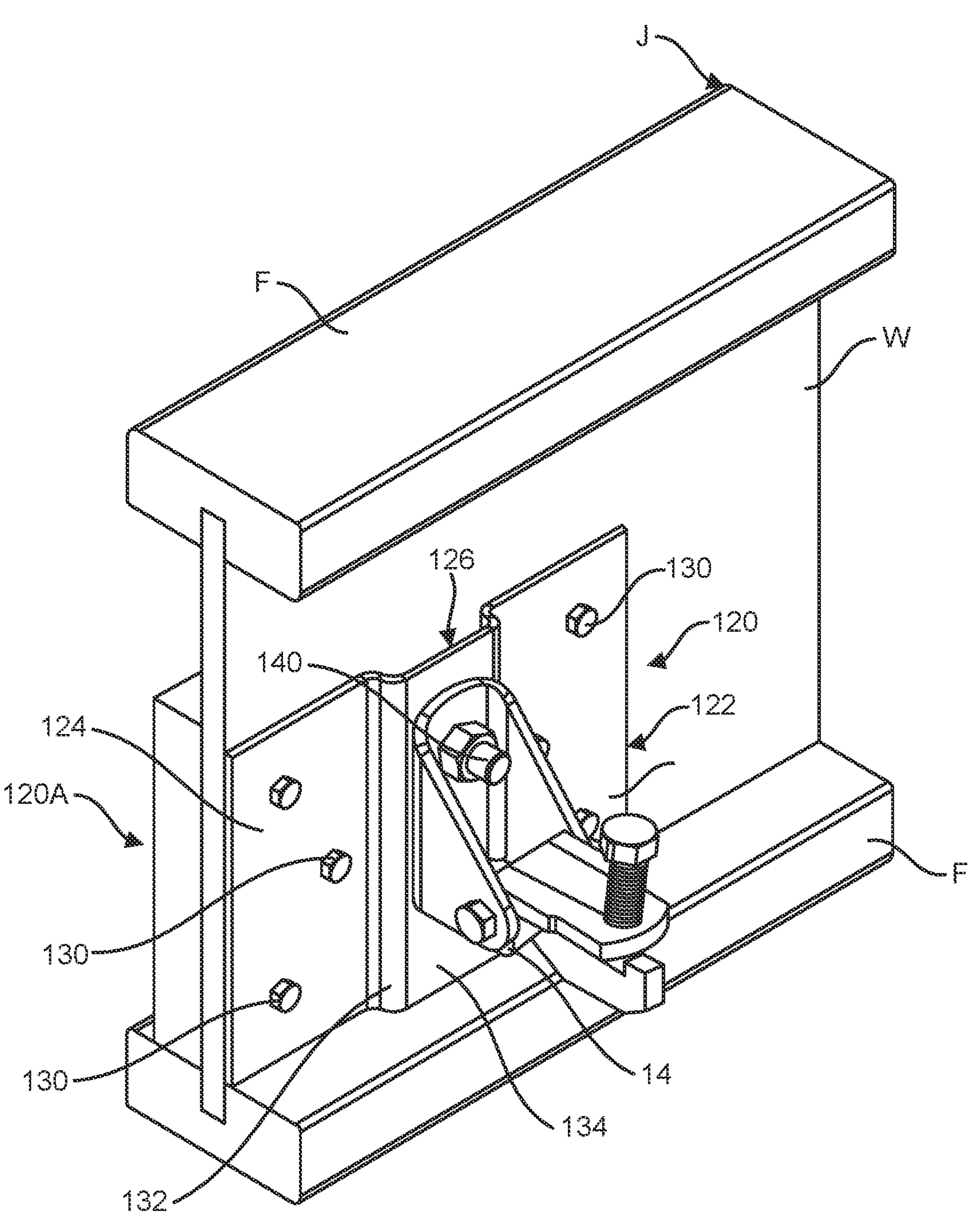
FIG. 5 is a perspective of a second embodiment of an attachment device attached to a structural component according to the teachings of the present disclosure.

Referring to FIG. 5, a second embodiment of an attachment device for attaching to a structural component is generally indicated at reference numeral 120. The attachment device 120 is configured to be attached to a structural component, such as a wooden I-joist J, and to a connection fitting 14 for attachment to a suitable sway brace restraint, or the like. The attachment device 120 includes a body or plate member 122 configured to be attached to a web W of the joist J. The plate member 122 has a planar portion 124 and a raised portion 126. The planar portion 124 provides a contact surface for engaging the web W of the joist J. In the illustrated embodiment, the attachment device 120, and particularly the plate member 122, has a rectangular shape. However, the attachment device 120 could be formed in any suitable shape such as round or oblong without departing from the scope of the disclosure. Fastener holes in the plate member 122 are configured to receive fasteners 130 for securing the attachment device 120 to the web W of the joist J. In one embodiment, the fasteners 130 are wooden screws that are configured to be drive into the wooden joist J. Thus, pre-drilled holes for receiving standard bolts are not formed in the joist J.

The raised portion 126 is disposed generally in a middle of the planar portion 124 such that the raised portion is flanked on both sides by the planar portion. In the illustrated embodiment, the raised portion 126 comprises a generally rectangular or trapezoidal projection including curved longitudinal edges 132 projecting away from the planar portion 124, and a planar engagement surface 134 between the longitudinal edges. Thus, the planar engagement surface 134 is located within a plane that is spaced away from the plane of the planar portion 124 along a direction extending orthogonally to both planes. A post 140 extends from the planar engagement surface 134 for attaching the fitting 14 to the attachment device 120. Therefore, the fitting 14 is spaced away from the web W of the joist J a sufficient amount to prevent the fitting from being engaged by the flange F. This allows the fitting 14 to be attached to the attachment device 120 in any desired angular orientation. The fitting 14 is also able to be attached to the attachment device 120 without making a through hole in the web W of the joist J. While the raised portion 126 is shown as a rectangular or trapezoidal projection, it will be understood that the raised portion could have other configurations without departing from the scope of the disclosure.

Figure 6:
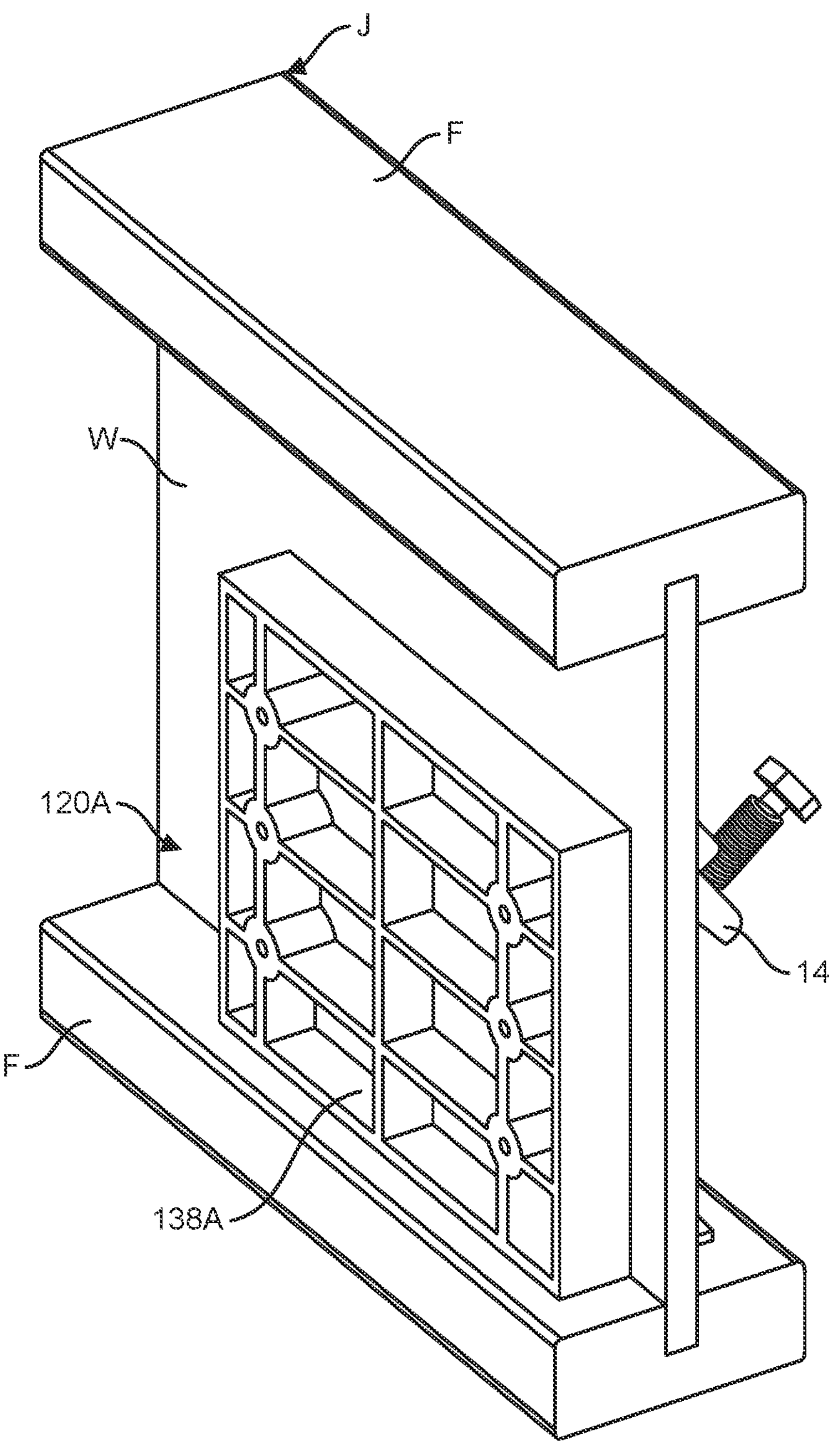
FIG. 6 is a perspective of a second attachment device attached to the structural component of FIG. 5.

The attachment device 120 may be considered a first attachment device and is configured for attachment to a first face of the web W of the joist J. Referring to FIG. 6, a second attachment device 120A is configured for attachment to an opposite face of the web W of the joist J. The second attachment device 120A comprises a block member 138A. In one embodiment, the block member 138A comprises a wood, plastic, or composite material. Still other materials for the block members are envisioned. When the fasteners 130 are inserted through the fastener holes in the first attachment device 120, they will pass through the web W of the joist J, and into the block member 138A. Therefore, the self-tapping wooden screws 130 are anchored in the block member 138A. The fastening engagement between the fasteners 130 and the block member 138A secures both the first and second attachment devices 120, 120A to the web W of the joist J. Additionally, the block member 138A is thicker than the web W of the joist J and thus provides a more robust and mechanically sound structure for receiving the fasteners than just using the web W of the joist J.

Figure 7:
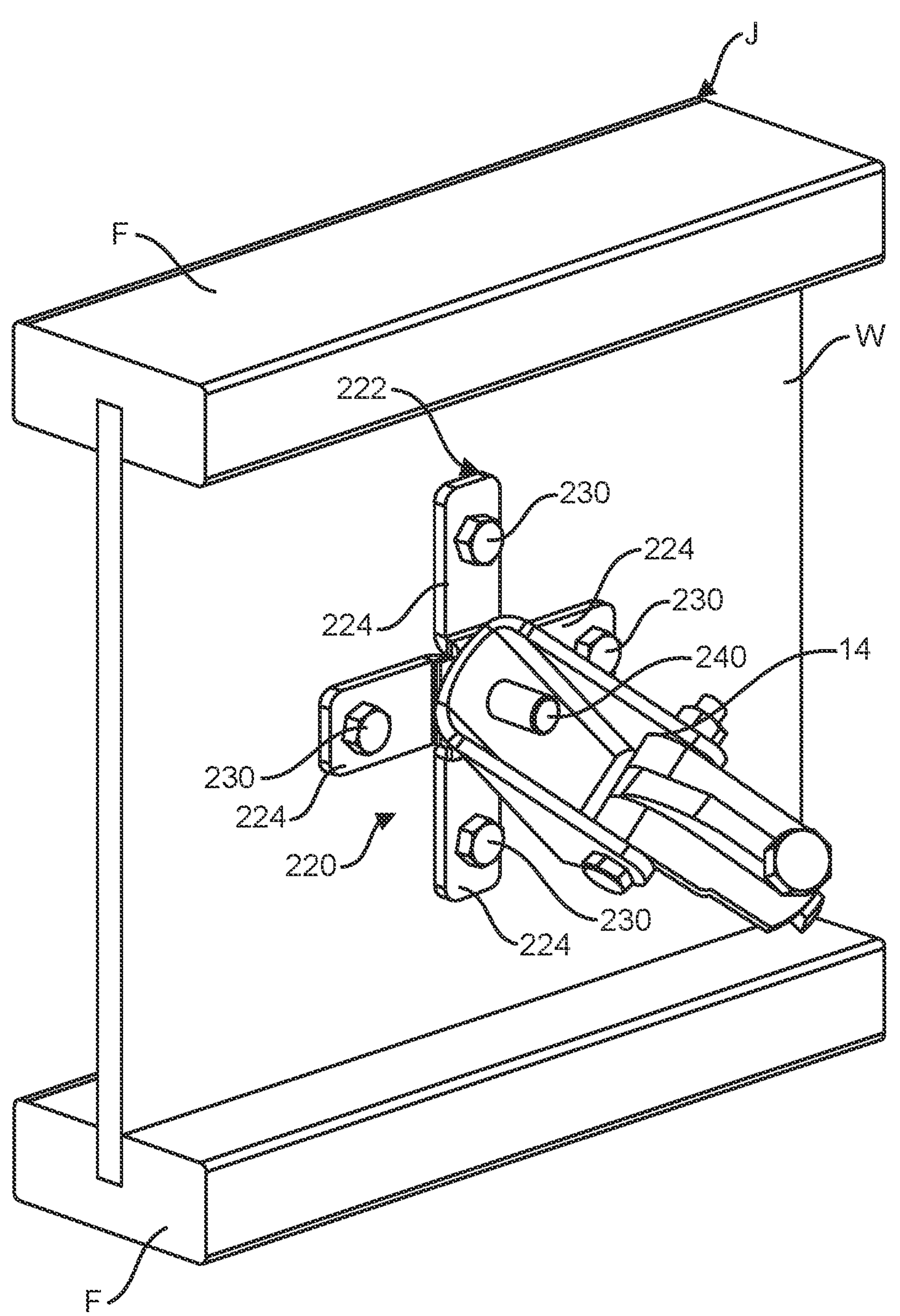
FIG. 7 is a perspective of a third embodiment of an attachment device attached to a structural component according to the teachings of the present disclosure.
Figure 8:
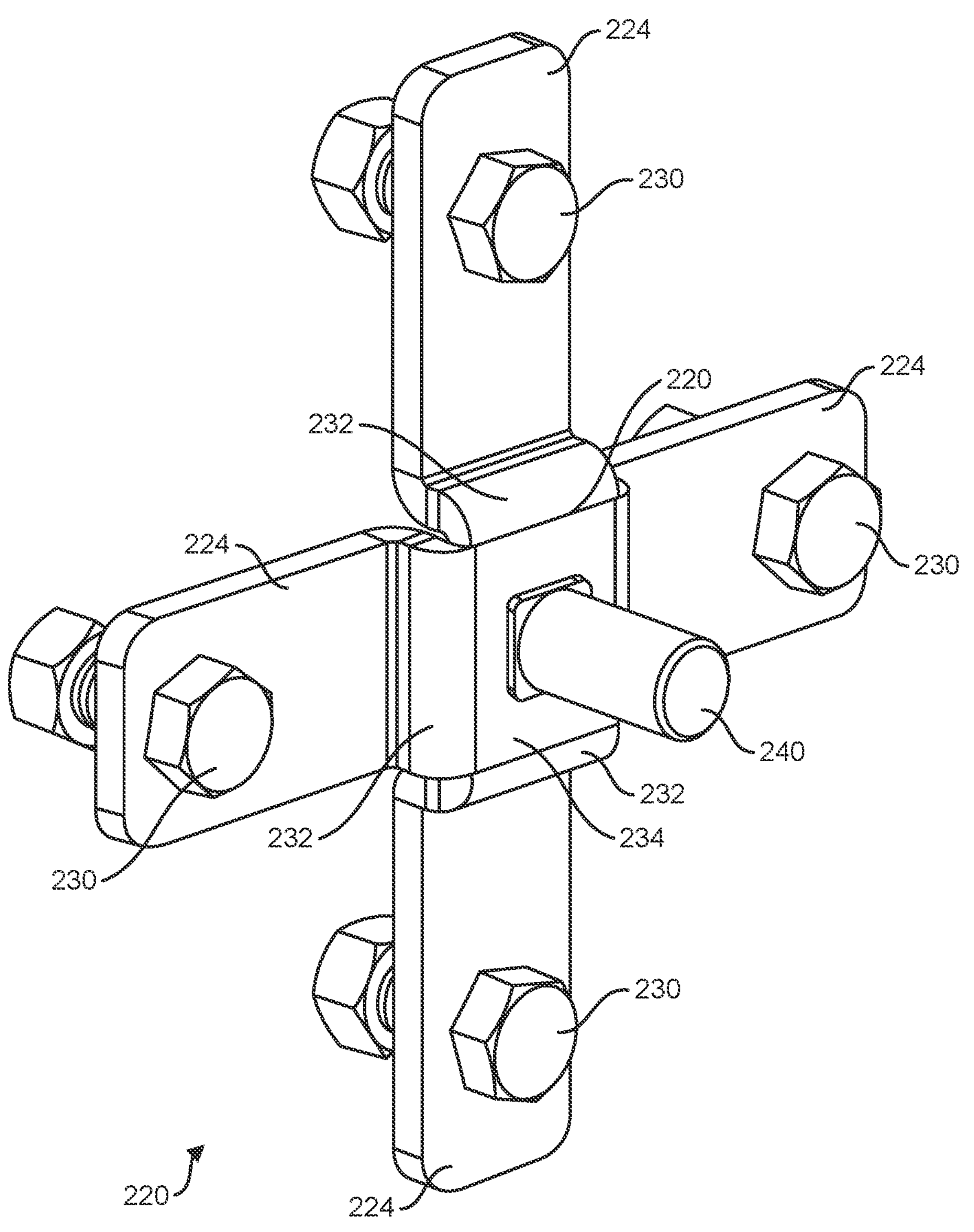
FIG. 8 is perspective of the attachment device of FIG. 7.

Referring to FIGS. 7 and 8, a third embodiment of an attachment device for attaching to a structural component is generally indicated at reference numeral 220. The attachment device 220 is configured to be attached to a structural component, such as a wooden I-joist J, and to a connection fitting 14 for attachment to a suitable sway brace restraint, or the like. The attachment device 120 includes a body or plate member 222 configured to be attached to a web W of the joist J. The plate member 222 has a plurality of planar portions 224 and a raised portion 226. The planar portions 224 provides a contact surface for engaging the web W of the joist J. In the illustrated embodiment, the plate member 222 have a generally T-shape. However, the plate member 222 could be formed in any suitable shape such as round or rectangular without departing from the scope of the disclosure. Fastener holes in the plate member 222 are configured to receive fasteners 230 for securing the attachment device 220 to the web W of the joist J. In one embodiment, the fasteners 230 are standard bolt fasteners.

The raised portion 226 is disposed in a middle of the planar portions 224 such that the raised portion is flanked on top, bottom, left, and right sides by the planar portions. In the illustrated embodiment, the raised portion 226 comprises a rectangular projection including curved side edges 232 projecting away from the planar portions 224, and a planar engagement surface 234 between the side edges. Thus, the planar engagement surface 234 is located within a plane that is spaced away from the plane of the planar portions 224 along a direction extending orthogonally to both planes. A post 240 extends from the planar engagement surface 234 for attaching the fitting 14 to the attachment device 220. Therefore, the fitting 14 is spaced away from the web W of the joist J a sufficient amount to prevent the fitting from being engaged by the flange F. This allows the fitting 14 to be attached to the attachment device 220 in any desired angular orientation. The fitting 14 is also able to be attached to the attachment device 220 without making a through hole in the web W of the joist J. While the raised portion 226 is shown as a rectangular projection, it will be understood that the raised portion could have other configurations without departing from the scope of the disclosure.

Figure 9:
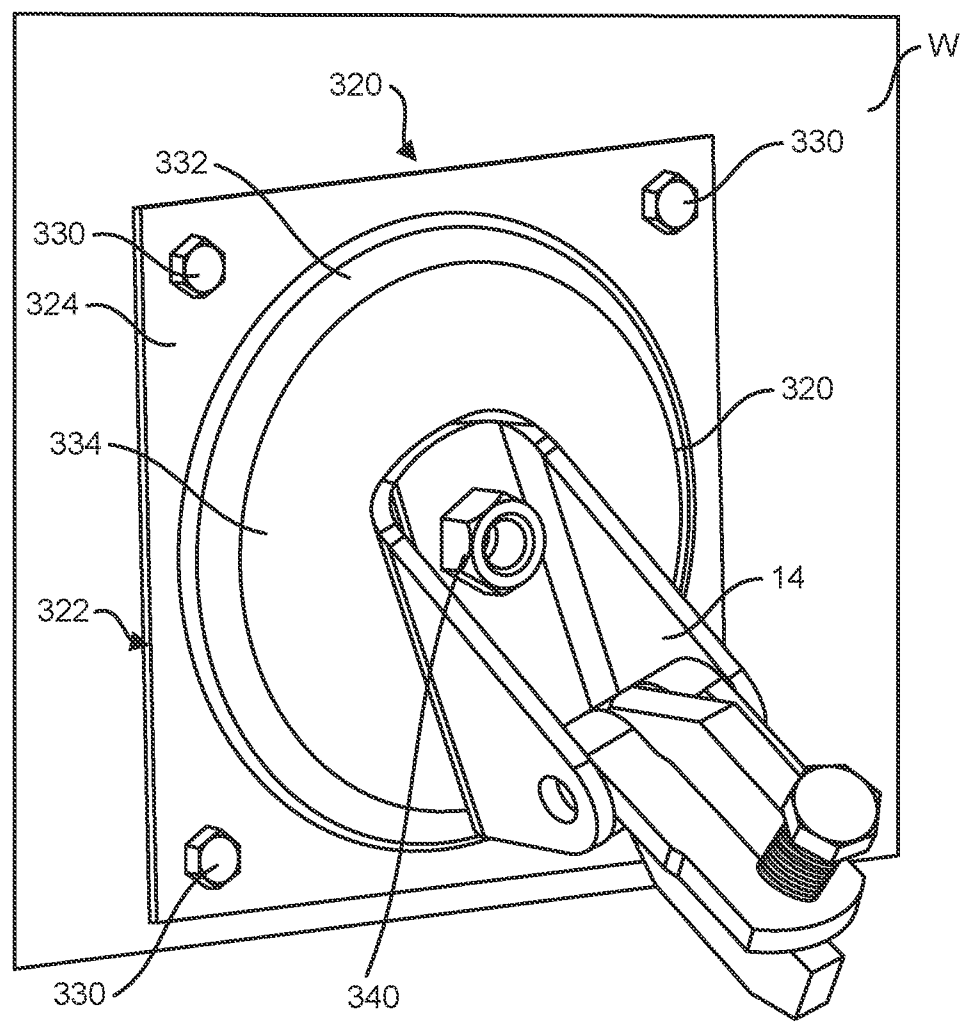
FIG. 9 is a perspective of a fourth embodiment of an attachment device attached to a structural component according to the teachings of the present disclosure.

Referring to FIG. 9, a fourth embodiment of an attachment device for attaching to a structural component is generally indicated at reference numeral 320. The attachment device 320 is configured to be attached to a structural component, such as a wooden I-joist/lumber, and to a connection fitting 14 for attachment to a suitable sway brace restraint, or the like. The attachment device 320 includes a body or plate member 322 configured to be attached to a web W of the joist. The plate member 322 has a planar portion 324 and a raised portion 326. The planar portion 324 provides a contact surface for engaging the web W of the joist. In the illustrated embodiment, the attachment device 320, and particularly the plate member 322, has a rectangular shape. However, the attachment device 320 could be formed in any suitable shape such as round or oblong without departing from the scope of the disclosure. Fastener holes (not shown) in the plate member 322 are configured to receive fasteners 330 for securing the attachment device 320 to the web W of the joist. In one embodiment, the fasteners 330 are standard bolt fasteners.

The raised portion 326 is disposed within an interior of the planar portion 324 such that the raised portion is surrounded on all sides by the planar portion. In the illustrated embodiment, the raised portion 326 comprises a circular projection including a curved circumferential edge 332 projecting away from the planar portion 324, and a planar engagement surface 334 bounded by the circumferential edge. Thus, the planar engagement surface 334 is located within a plane that is spaced away from the plane of the planar portion 324 along a direction extending orthogonally to both planes. A hole (not shown) is configured to receive a fastener 340 for attaching the fitting 14 to the attachment device 320. Therefore, the fitting 14 is spaced away from the web W of the joist a sufficient amount to prevent the fitting from being engaged by the joist flanges. This allows the fitting 14 to be attached to the attachment device 320 in any desired angular orientation. While the raised portion 326 is shown as a circular projection, it will be understood that the raised portion could have other configurations without departing from the scope of the disclosure.

Figure 10:
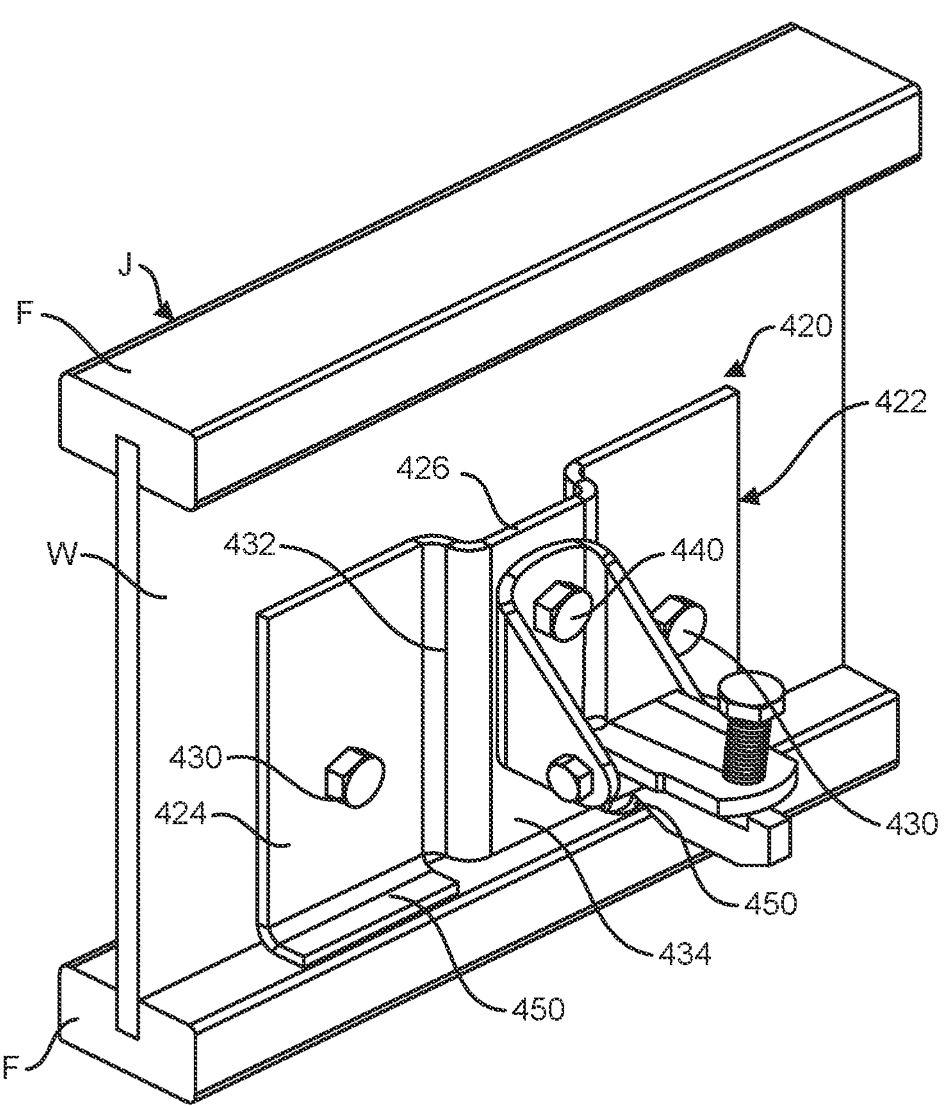
FIG. 10 is a perspective of a fifth embodiment of an attachment device attached to a structural component according to the teachings of the present disclosure.

Referring to FIG. 10, a fifth embodiment of an attachment device for attaching to a structural component is generally indicated at reference numeral 420. The attachment device 420 is configured to be attached to a structural component, such as a wooden I-joist J, and to a connection fitting 14 for attachment to a suitable sway brace restraint, or the like. The attachment device 420 includes a body or plate member 422 configured to be attached to a web W of the joist J. The plate member 422 has a planar portion 424 and a raised portion 426. The planar portion 424 provides a contact surface for engaging the web W of the joist J. In the illustrated embodiment, the attachment device 420, and particularly the plate member 422, has a rectangular shape. However, the attachment device 420 could be formed in any suitable shape such as round or oblong without departing from the scope of the disclosure. Fastener holes (not shown) in the plate member 422 are configured to receive fasteners 430 for securing the attachment device 420 to the web W of the joist. In one embodiment, the fasteners 430 are standard bolt fasteners.

The raised portion 426 is disposed generally in a middle of the planar portion 424 such that the raised portion is flanked on both sides by the planar portion. In the illustrated embodiment, the raised portion 426 comprises a generally rectangular or trapezoidal projection including curved longitudinal edges 432 projecting away from the planar portion 424, and a planar engagement surface 434 between the longitudinal edges. Thus, the planar engagement surface 434 is located within a plane that is spaced away from the plane of the planar portion 424 along a direction extending orthogonally to both planes. A hole (not shown) is configured to receive a fastener 440 for attaching the fitting 14 to the attachment device 420. Therefore, the fitting 14 is spaced away from the web W of the joist J a sufficient amount to prevent the fitting from being engaged by the flange F. This allows the fitting 14 to be attached to the attachment device 420 in any desired angular orientation. The fitting 14 is also able to be attached to the attachment device 420 without making a through hole in the web W of the joist J. While the raised portion 426 is shown as a rectangular or trapezoidal projection, it will be understood that the raised portion could have other configurations without departing from the scope of the disclosure.

Additionally, flanges 450 extend transversely from a bottom edge of the plate member 422 on opposite sides of the raised portion 426. The flanges 450 provide an engagement surface with the bottom flange F of the joist J. To this effect, the flanges 450 support the attachment device 420 in vertical loading conditions. As a result, the overall size of the attachment device 420 is reduced while the load capacity of the attachment device is increased.

Figure 11:
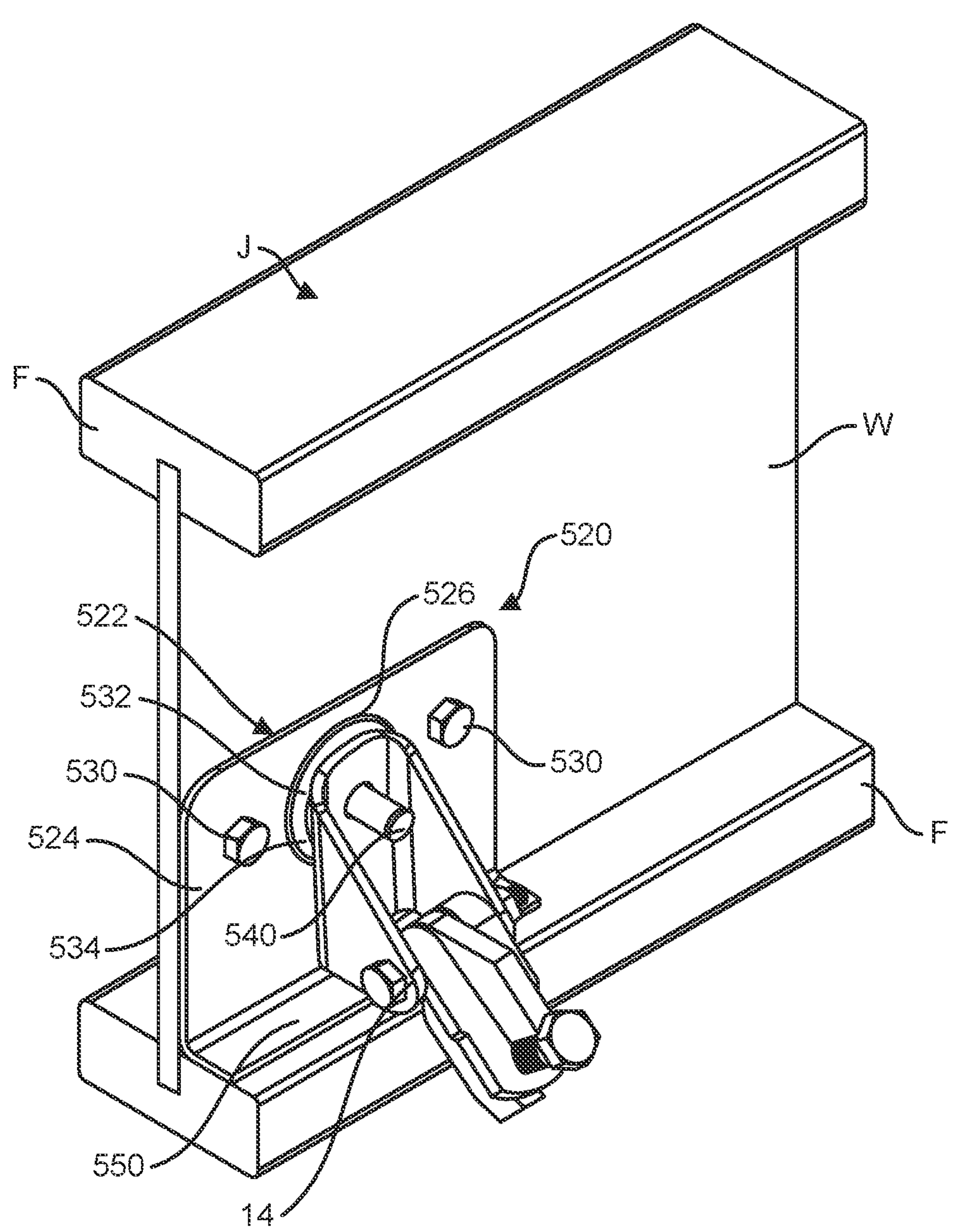
FIG. 11 is a perspective of a sixth embodiment of an attachment device attached to a structural component according to the teachings of the present disclosure.

Referring to FIG. 11, a sixth embodiment of an attachment device for attachment to a structural component is generally indicated at reference numeral 520. The attachment device 520 is configured to be attached to a structural component, such as a wooden I-joist J, and to a connection fitting for attachment to a suitable sway brace restraint, or the like. The attachment device 520 includes a body or plate member 522 configured to be attached to a web W of the joist J. The plate member 522 has a planar portion 524 and a raised portion 526. The planar portion 524 provides a contact surface for engaging the web W of the joist J. In the illustrated embodiment, the attachment device 520, and particularly the plate member 522, has a generally rectangular shape. However, the attachment device 520 could be formed in any suitable shape such as round or oblong without departing from the scope of the disclosure. Fastener holes (not shown) in the plate member 522 are configured to receive fasteners 530 for securing the attachment device 520 to the web W of the joist J. In one embodiment, the fasteners 530 are standard bolt fasteners.

The raised portion 526 is disposed within an interior of the planar portion 524 such that the raised portion is surrounded on all sides by the planar portion. In the illustrated embodiment, the raised portion 526 comprises a circular projection including a curved circumferential edge 532 projecting away from the planar portion 524, and a planar engagement surface 534 bounded by the circumferential edge. Thus, the planar engagement surface 534 is located within a plane that is spaced away from the plane of the planar portion 524 along a direction extending orthogonally to both planes. A post 540 extends from the planar engagement surface 534 for attaching the fitting 14 to the attachment device 520. Therefore, the fitting 14 is spaced away from the web W of the joist J a sufficient amount to prevent the fitting from being engaged by the flange F. This allows the fitting 14 to be attached to the attachment device 520 in any desired angular orientation. The fitting 14 is also able to be attached to the attachment device 520 without making a through hole in the web W of the joist J. While the raised portion 526 is shown as a circular projection, it will be understood that the raised portion could have other configurations without departing from the scope of the disclosure.

Additionally, a flange 550 extends transversely from a bottom edge of the planar portion 524 of the plate member 522. The flange 550 provides an engagement surface with the bottom flange F of the joist J. To this effect, the flange 550 supports the attachment device 520 in vertical loading conditions. As a result, the overall size of the attachment device 520 is reduced while load capacity of the attachment device is increased.

Figure 12:
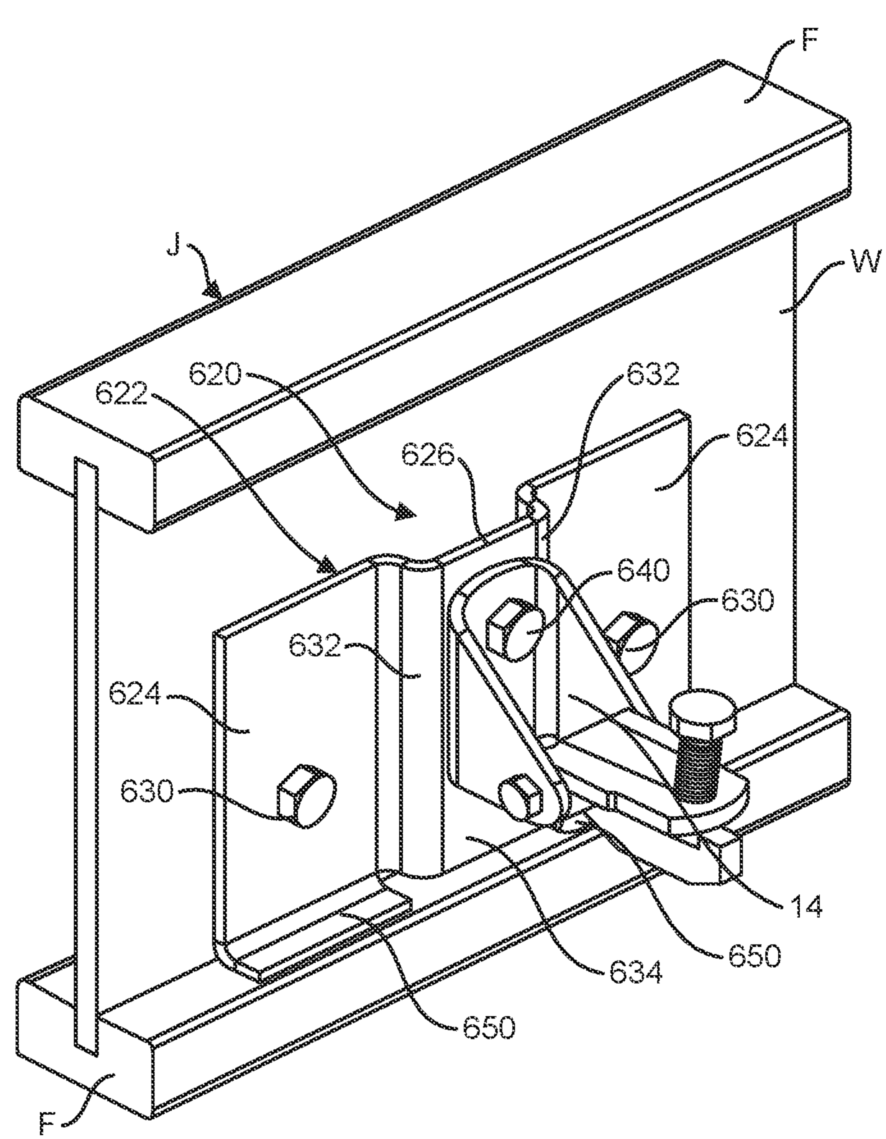
FIG. 12 is a perspective of a seventh embodiment of an attachment device attached to a structural component according to the teachings of the present disclosure.
Figure 13:
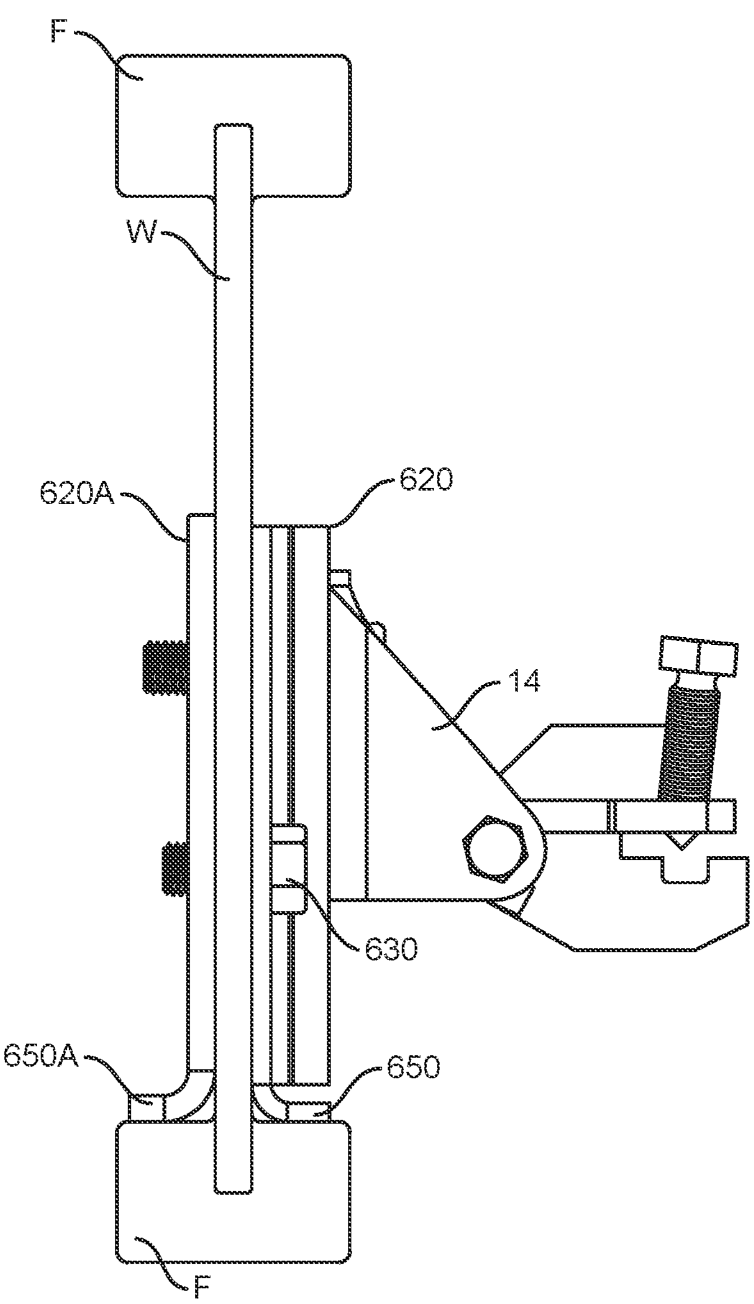
FIG. 13 is a side view of the attachment device and structural component of FIG. 12 and further showing a second attachment device.

Referring to FIGS. 12 and 13, a seventh embodiment of an attachment device for attaching to a structural component is generally indicated at reference numeral 620. The attachment device 620 is configured to be attached to a structural component, such as a wooden I-joist J, and to a connection fitting 14 for attachment to a suitable sway brace restraint, or the like. The attachment device 620 includes a body or plate member 622 configured to be attached to a web W of the joist J. The plate member 622 has a planar portion 624 and a raised portion 626. The planar portion 624 provides a contact surface for engaging the web W of the joist J. In the illustrated embodiment, the attachment device 620, and particularly the plate member 622, has a rectangular shape. However, the attachment device 620 could be formed in any suitable shape such as round or oblong without departing from the scope of the disclosure. Fastener holes (not shown) in the plate member 622 are configured to receive fasteners 630 for securing the attachment device 620 to the web W of the joist. In one embodiment, the fasteners 630 are standard bolt fasteners.

The raised portion 626 is disposed generally in a middle of the planar portion 624 such that the raised portion is flanked on both sides by the planar portion. In the illustrated embodiment, the raised portion 626 comprises a generally rectangular or trapezoidal projection including curved longitudinal edges 632 projecting away from the planar portion 624, and a planar engagement surface 634 between the longitudinal edges. Thus, the planar engagement surface 634 is located within a plane that is spaced away from the plane of the planar portion 624 along a direction extending orthogonally to both planes. A hole (not shown) is configured to receive a fastener 640 for attaching the fitting 14 to the attachment device 620. Therefore, the fitting 14 is spaced away from the web W of the joist J a sufficient amount to prevent the fitting from being engaged by the flange F. This allows the fitting 14 to be attached to the attachment device 620 in any desired angular orientation. While the raised portion 626 is shown as a rectangular or trapezoidal projection, it will be understood that the raised portion could have other configurations without departing from the scope of the disclosure.

Additionally, flanges 650 extend transversely from a bottom edge of the plate member 622 on opposite sides of the raised portion 626. The flanges 650 provide an engagement surface with the bottom flange F of the joist J. To this effect, the flanges 650 support the attachment device 620 in vertical loading conditions. As a result, the overall size of the attachment device 620 is reduced while and load capacity of the attachment device is increased.

The attachment device 620 may be considered a first attachment device, and is configured for attachment to a first face of the web W of the joist J. Referring to FIG. 13, a second attachment device 620A is configured for attachment to an opposite face of the web W of the joist J. When the fasteners 630 are inserted through the fastener holes in the first attachment device 620, they will pass through the web W of the joist J and into the fastener holes in the second attachment device 620A.

Figure 14:
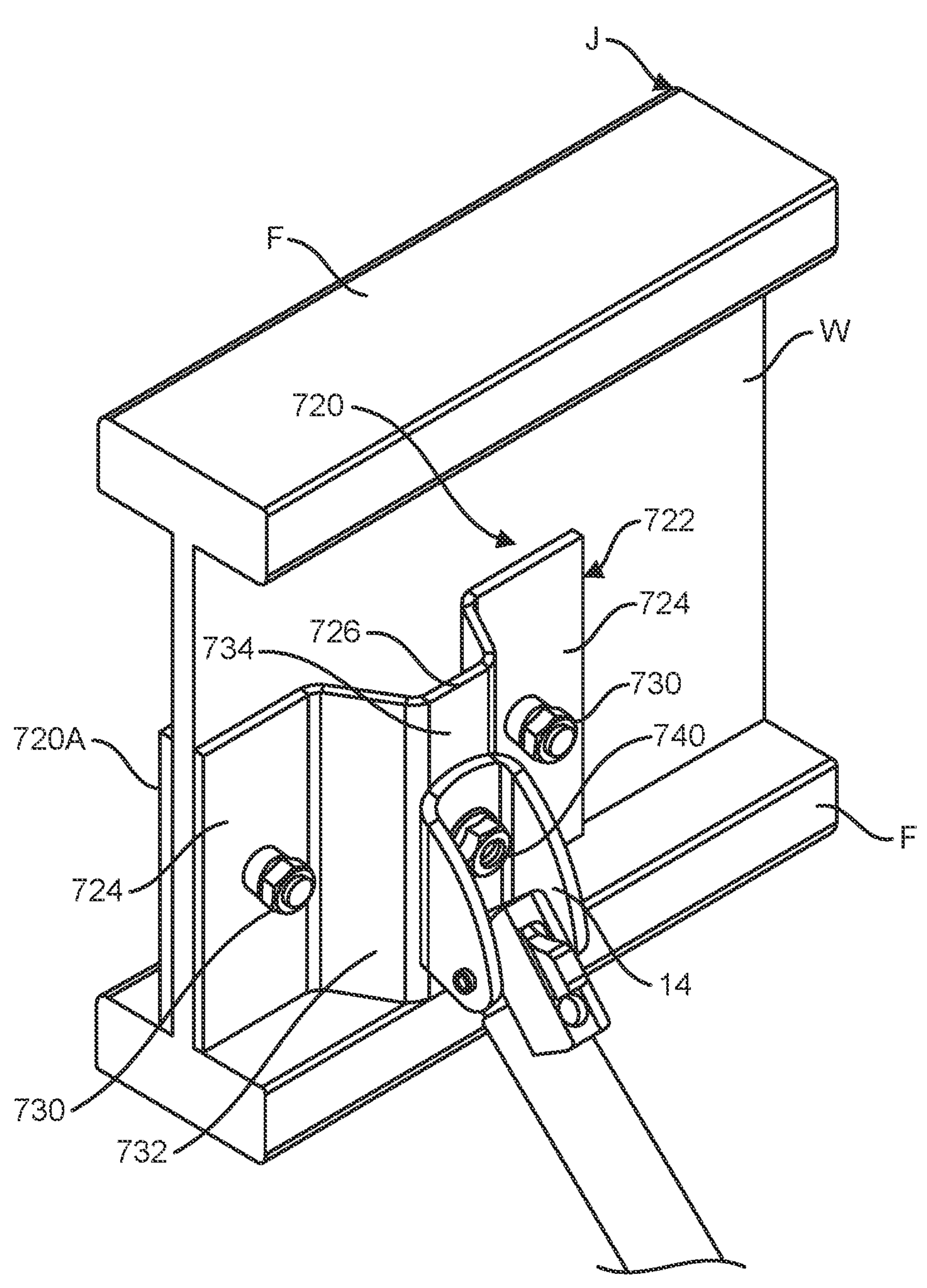
FIG. 14 is a perspective of an eighth embodiment of an attachment device attached to a structural component of a building according to the teachings of the present disclosure.

Referring to FIG. 14, an eight embodiment of an attachment device for attachment to a structural component is generally indicated at reference numeral 720. The attachment device 720 is configured to be attached to a structural component, such as a wooden I-joist J, and to a connection fitting 14 for attachment to a suitable sway brace restraint 10, or the like. The attachment device 720 includes a body or plate member 722 configured to be attached to a web W of the joist J. The plate member 722 has a planar portion 624 and a raised portion 726. The planar portion 724 provides a contact surface for engaging the web W of the joist J. In the illustrated embodiment, the attachment device 720, and particularly the plate member 722, has a generally rectangular shape. However, the attachment device 720 could be formed in any suitable shape such as round or oblong without departing from the scope of the disclosure. Fastener holes (not shown) in the plate member 722 are configured to receive fasteners 730 for securing the attachment device 720 to the web W of the joist J. In one embodiment, the fasteners 730 are twist-off nut/bolt fasteners for visual verification of the desired torque to be applied.

The raised portion 726 is disposed generally in a middle of the planar portion 724 such that the raised portion is flanked on both sides by the planar portion. In the illustrated embodiment, the raised portion 726 comprises a generally trapezoidal projection including planar longitudinal edges 732 projecting away from the planar portion 724 at an angle, and a planar engagement surface 734 between the longitudinal edges. Thus, the planar engagement surface 734 is located within a plane that is spaced away from the plane of the planar portion 724 along a direction extending orthogonally to both planes. A hole (not shown) is configured to receive a fastener 740 for attaching the fitting 14 to the attachment device 720. Therefore, the fitting 14 is spaced away from the web W of the joist J a sufficient amount to prevent the fitting from being engaged by the flange F. This allows the fitting 14 to be attached to the attachment device 720 in any desired angular orientation. The fitting 14 is also able to be attached to the attachment device 720 without making a through hole in the web W of the joist J. While the raised portion 726 is shown as a trapezoidal projection, it will be understood that the raised portion could have other configurations without departing from the scope of the disclosure.

The attachment device 720 may be considered a first attachment device, and is configured for attachment to a first face of the web W of the joist J. A second attachment device 720A is configured for attachment to an opposite face of the web W of the joist J. When the fasteners 730 are inserted through the fastener holes in the first attachment device 720, they will pass through the web W of the joist J and into the fastener holes in the second attachment device 720A.

Figure 15:
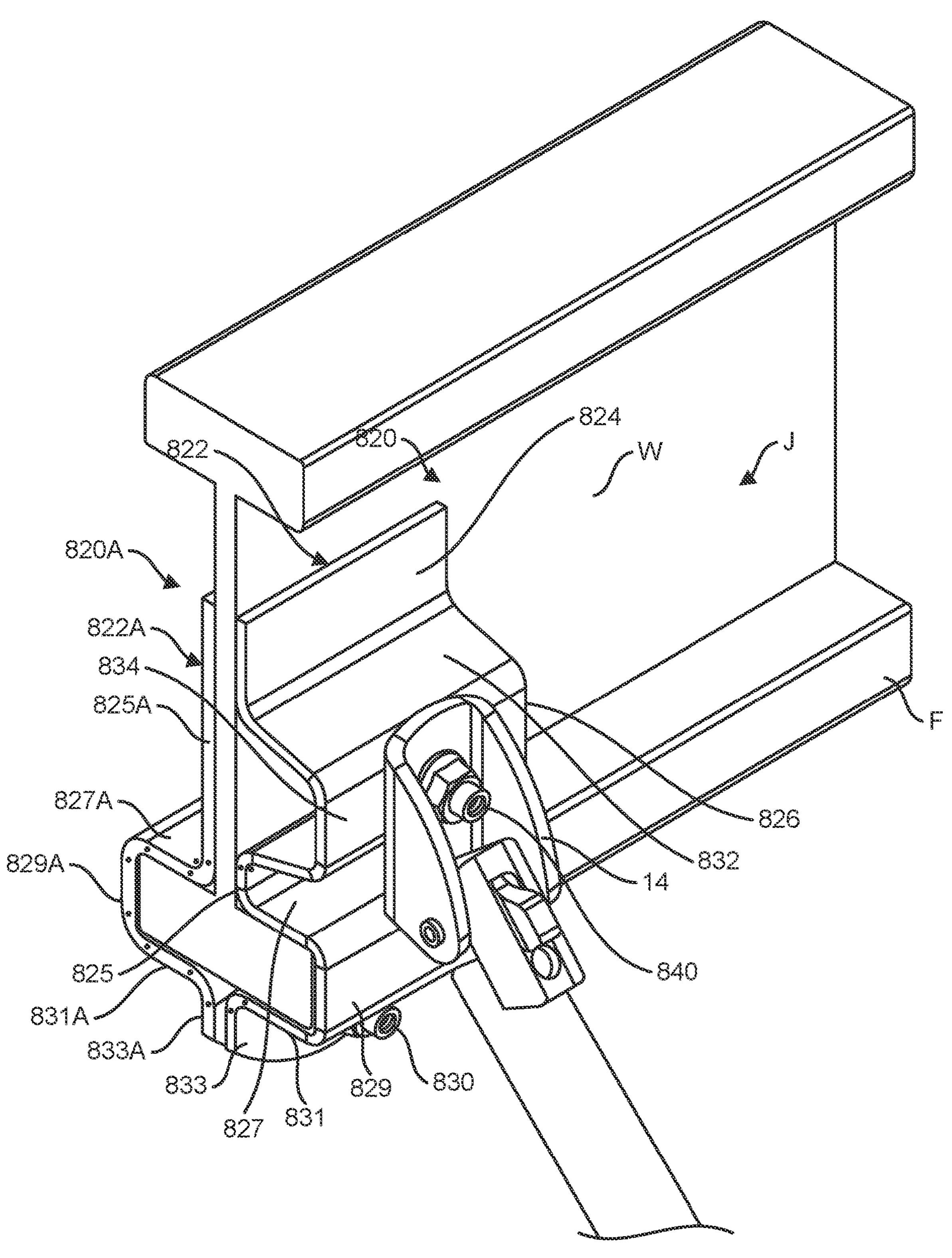
FIG. 15 is a perspective of a ninth embodiment of an attachment device attached to a structural component according to the teachings of the present disclosure.
Figure 15A:
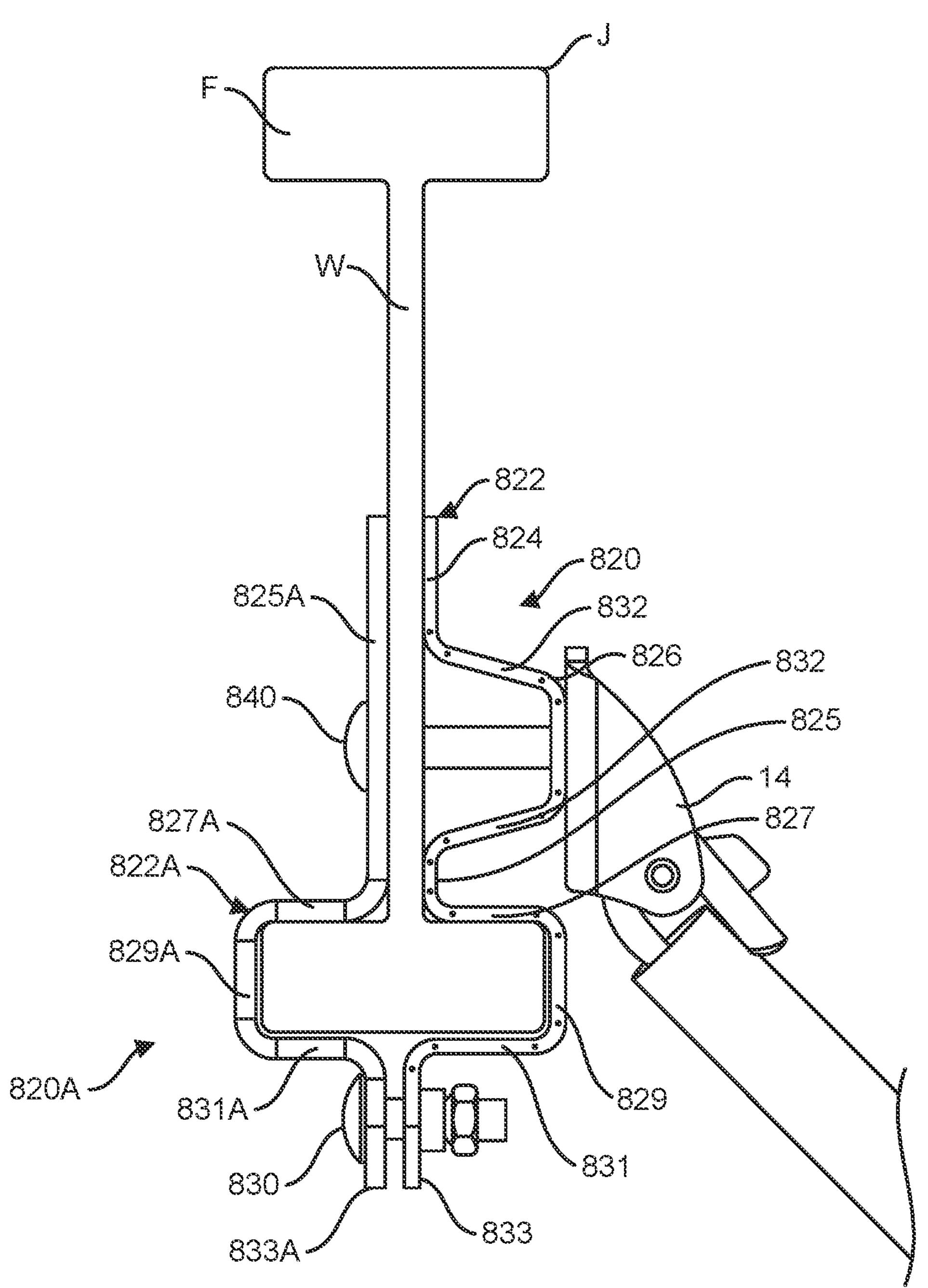
FIG. 15A is a side view of the attachment device and structural component of FIG. 15 and further showing a second attachment device.

Referring to FIGS. 15 and 15A, a ninth embodiment of an attachment device for attachment to a structural component is generally indicated at reference numeral 820. The attachment device 820 is configured to be attached to a structural component, such as a wooden I-joist J, and to a connection fitting 14 for attachment to a suitable sway brace restraint 10, or the like. The attachment device 820 includes a body or plate member 822 configured to be attached to the joist J. The plate member 822 has a first planar portion 824, a raised portion 826 extending from the first planar portion, a second planar portion 825 extending from the raised portion, a third planar portion 827 extending from the second planar portion 825, a fourth planar portion 829 extending from the third planar portion, a fifth planar portion 831 extending from the fourth planar portion, and a sixth planar portion 833 extending from the fifth planar portion. The first and second planar portions 824, 825 provide a contact surface for engaging the web W of the joist J. The third planar portion 827 extends orthogonally from the second planar portion 825 and provides a contact surface for the top of the bottom flange F of the joist J. The fourth planar portion 829 extends orthogonally from the third planar portion 825 and provides a contact surface for a side edge of the bottom flange F of the joist J. The fifth planar portion 831 extends orthogonally from the fourth planar portion 829 and provides a contact surface for a bottom of the bottom flange F of the joist J. The sixth planar portion 833 extends orthogonally from the fifth planar portion 831. A fastener hole (not shown) in the sixth planar portion 833 is configured to receive a fastener 830 for securing the attachment device 820 to the joist J. In one embodiment, the fastener 830 is a twist-off bolt for visual verification of the desired torque to be applied.

The raised portion 826 is disposed generally in a middle of the first and second planar portions 824, 825 such that the raised portion is flanked on both sides by the planar portions. In the illustrated embodiment, the raised portion 826 comprises a trapezoidal projection including planar longitudinal edges 832 projecting away from the planar portions 824, 825 at an angle, and a planar engagement surface 834 between the longitudinal edges. Thus, the planar engagement surface 834 is located within a plane that is spaced away from the plane of the first and second planar portions 824, 825 along a direction extending orthogonally to both planes. A hole (not shown) is configured to receive a fastener 840 for attaching the fitting 14 to the attachment device 820. Therefore, the fitting 14 is spaced away from the web W of the joist J a sufficient amount to prevent the fitting from being engaged by the flange F. This allows the fitting 14 to be attached to the attachment device 820 in any desired angular orientation. The fitting 14 is also able to be attached to the attachment device 820 without making a through hole in the web W of the joist J. While the raised portion 826 is shown as a trapezoidal projection, it will be understood that the raised portion could have other configurations without departing from the scope of the disclosure.

The attachment device 820 may be considered a first attachment device, and is configured for attachment to a first face of the web W of the joist J. A second attachment device 820A is configured for attachment to an opposite face of the web W of the joist J. The second attachment device 820A comprises a plate member 822A including a first planar portion 825A, a second planar portion 827A extending from the first planar portion 825A, a third planar portion 829A extending from the second planar portion, a fourth planar portion 831A extending from the third planar portion, and a fifth planar portion 833A extending from the fourth planar portion. The first planar portion 825A provide a contact surface for engaging the web W of the joist J. The second planar portion 827A extends orthogonally from the first planar portion 825A and provides a contact surface for the top of the bottom flange F of the joist J. The third planar portion 829A extends orthogonally from the second planar portion 825A and provides a contact surface for the side edge of the bottom flange F of the joist J. The fourth planar portion 831A extends orthogonally from the third planar portion 829A and provides a contact surface for the bottom of the bottom flange F of the joist J. The fifth planar portion 833A extends orthogonally from the fourth planar portion 831A. A fastener hole (not shown) in the fifth planar portion 833A is configured to receive the fastener 830 for securing the two attachment devices 820, 820A to the joist J.

Figure 16:
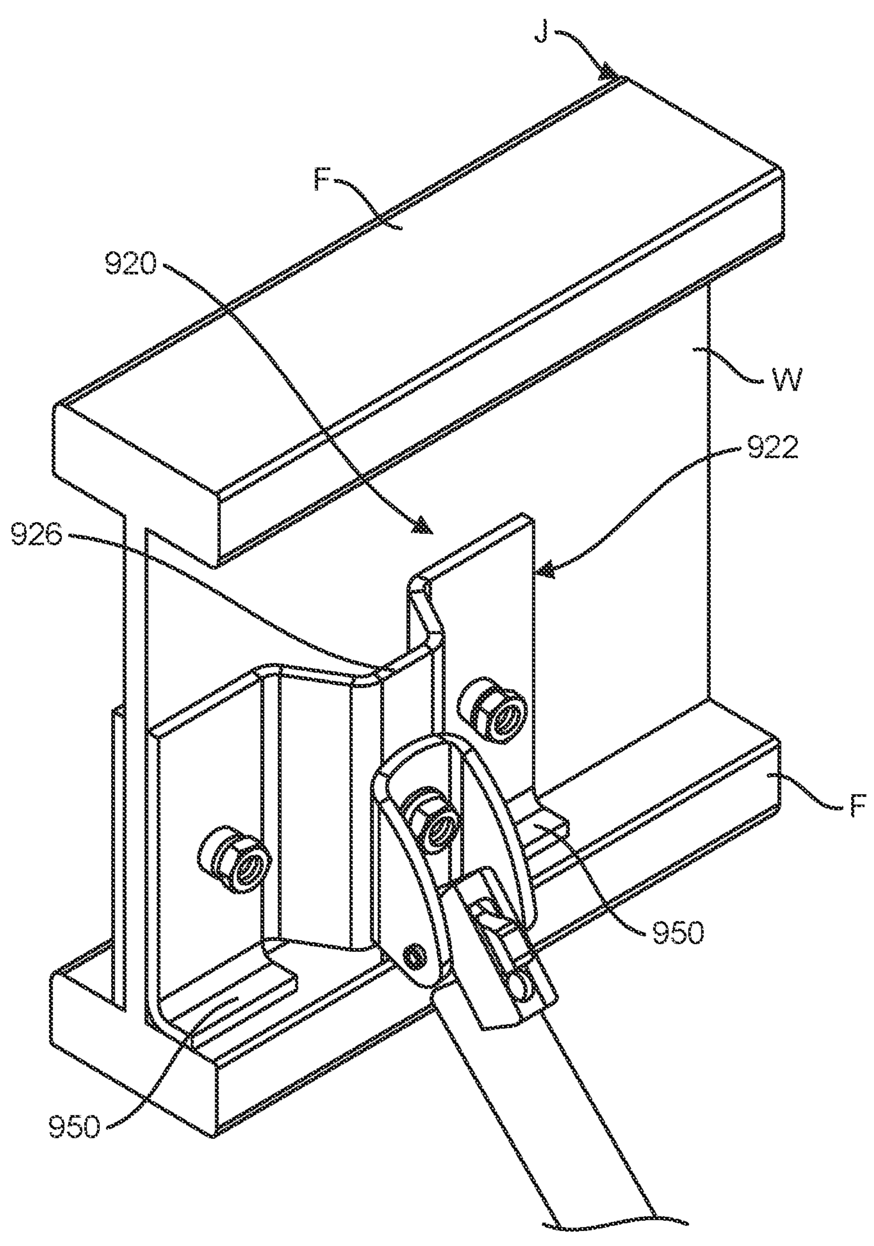
FIG. 16 is a perspective of a tenth embodiment of an attachment device attached to a structural component according to the teachings of the present disclosure.

Referring to FIG. 16, a tenth embodiment of an attachment device for attaching to a structural component is generally indicated at reference numeral 920. The attachment device 920 is substantially the same as attachment device 720 and includes flanges 950 extending transversely from a bottom edge of plate member 922 on opposite sides of the raised portion 926. The flanges 950 provide an engagement surface with the bottom flange F of the joist J. To this effect, the flanges 950 support the attachment device 920 in vertical loading conditions. As a result, the overall size of the attachment device 920 is reduced while and load capacity of the attachment device is increased.

Figure 17:
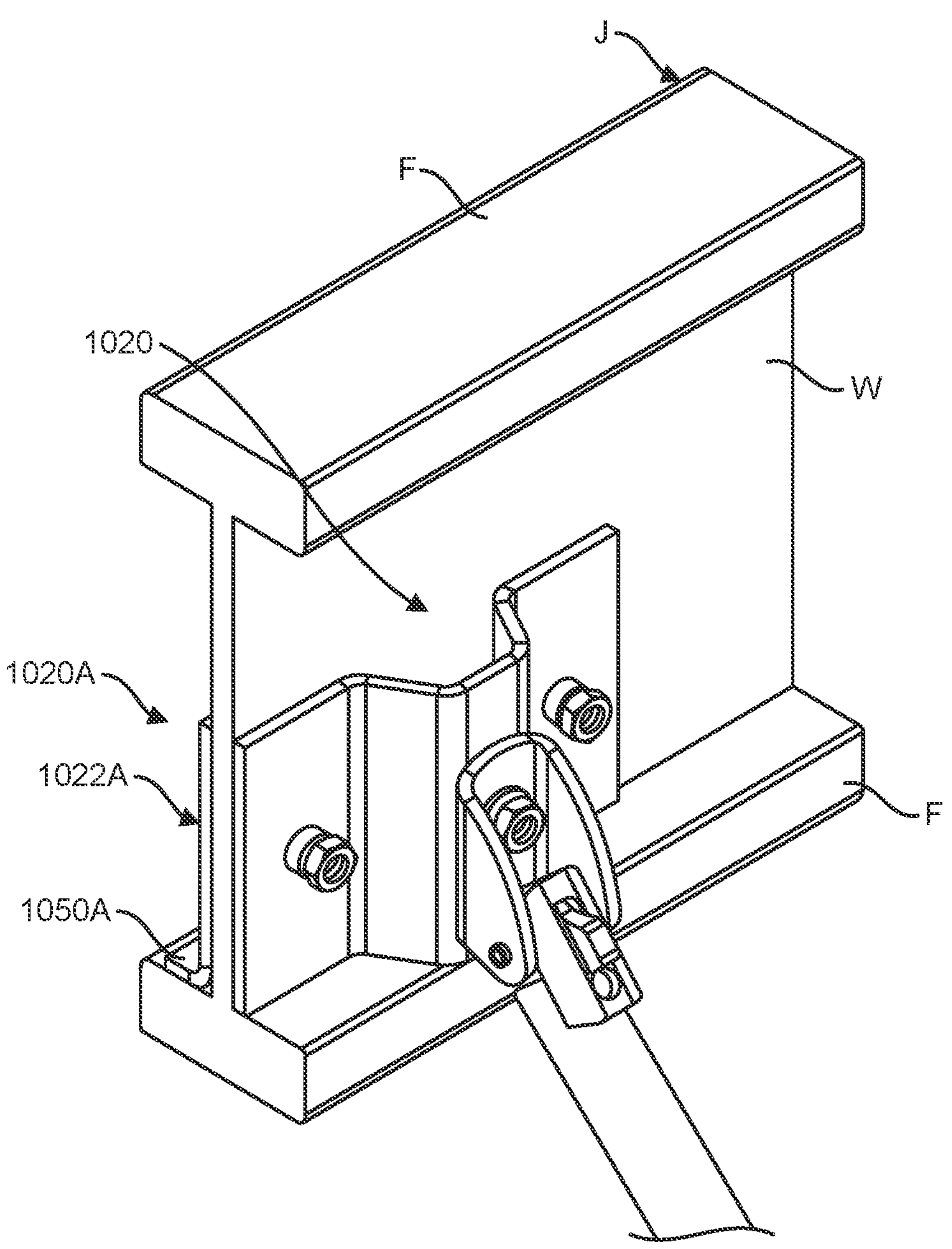
FIG. 17 is a perspective of an eleventh embodiment of an attachment device attached to a structural component according to the teachings of the present disclosure.

Referring to FIG. 17, an eleventh embodiment of an attachment device for attaching to a structural component is generally indicated at reference numeral 1020. The attachment device 1020 is substantially the same as attachment device 720. A second attachment device 1020A includes a plate member 1022A and a flange 1050A extending transversely from a bottom edge of plate member 1022A. The flange 1050A provides an engagement surface with the bottom flange F of the joist J. To this effect, the flange 1050A supports the attachment device 1020A in vertical loading conditions. As a result, the overall size of the attachment device 1020A is reduced while and load capacity of the attachment device is increased.

It is apparent that the elements, features, and/or teachings set forth in each embodiment disclosed herein are not limited to the specific embodiments the elements, features and/or teachings are described in. Accordingly, it is understood that the elements features and/or teachings described in one embodiment may be applied to one or more of the other embodiments disclosed herein.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An attachment device assembly for attaching to a structural component of a building, the attachment device assembly comprising:

an attachment device configured to be attached directly to the structural component, the attachment device including a first plate member including a planar portion having an inner surface configured for abutting a first side of the structural component and the planar portion defining a first fastener opening, and a raised portion extending outward from the planar portion having an inner surface that is spaced outward from the inner surface of the planar portion and an outer surface opposite the inner surface of the raised portion, and a second plate member configured for engagement with a second side of the structure component opposite the first side, wherein the second plate member defines a second fastener opening alignable with the first fastener opening when the first and second plate members are in engagement with the respective first and second sides of the structural component;

a fastener configured to be received in the first and second fastener openings and through the structural component; and a fitting secured to and engaging the outer surface of the raised portion, wherein the fitting is configured to attach to a sway brace, wherein the structural component is a joist.

2. The attachment device assembly of claim 1, in combination with the structural component, wherein the structural component comprises a wooden I-joist.

3. The attachment device assembly of claim 1, wherein the fastener includes a wood screw, wherein the second plate member comprises a block member configured to receive the wood screw for attaching the attachment device to the structural component.

4. The attachment device assembly of claim 1, wherein the second plate comprises one of a wood, plastic, metal, or composite material.

5. The attachment device assembly of claim 1, wherein the fitting is secured to the raised portion through at least one fastener.

6. The attachment device assembly of claim 1, wherein the raised portion is flanked on at least two sides by the planar portion.

7. The attachment device assembly of claim 1, wherein the outer surface is located within a plane that is spaced away from a plane of the planar portion along a direction extending orthogonally to both planes.

8. An attachment device for attaching to a structural component of a building to couple a fitting to the structural component, the attachment device comprising:

a first attachment device for attaching to a first surface of the structural component and having first side and second side opposite the first side, a second attachment device for attachment to a second surface of the structural component opposite the first surface, a fastener configured to be received through the first and second attachment devices and through the structural component to secure the first and second attachment devices to the structural component; and wherein the first attachment device comprises a plate member configured to be attached directly to the structural component on the first side of the first attachment device, the plate member including a planar portion configured for engagement with the structural component and a raised portion spaced from the planar portion and configured to be engaged by the fitting to mount the fitting to the attachment device on the second side of the first attachment device for coupling the fitting to the structural component, the raised portion being flanked on at least two sides by the planar portion, wherein the raised portion comprises a planar engagement surface located within a plane that is spaced away from a plane of the planar portion along a direction extending orthogonally to both planes.

9. The attachment device of claim 8, wherein the planar portion defines an opening for receiving the fastener.

10. The attachment device of claim 9, wherein the opening includes one of a circular opening and an elongate slot.

11. The attachment device of claim 8, wherein the fastener comprises a wood screw.

12. The attachment device of claim 8, wherein the fastener comprises a standard bolt.

13. The attachment device of claim 8, wherein the fastener comprises a twist-off nut/bolt fastener.

14. The attachment device of claim 8, wherein the planar engagement surface of the raised portion is configured to engage the fitting.

15. The attachment device of claim 8, wherein the structural component comprises a I-joist including a top flange, a bottom flange, and web extending between the flanges, and wherein the plate member includes a flange extending transversely from the planar portion, the flange being configured to engage the bottom flange of the I-joist to support the attachment device under a vertical load.

16. The attachment device of claim 8, wherein the second attachment device comprises a plate member including planar portion configured for engagement with the structural component and a raised portion spaced from the planar portion.

17. The attachment device of claim 8, wherein the second attachment device comprises a block member, the block member being configured to receive the fastener for attaching the first and second attachment devices to the structural component and wherein the second attachment device includes a pair of hook members for retaining the block member to the second attachment device.

18. The attachment device of claim 8, wherein the second attachment device comprises one of a wood, plastic, or composite material.

19. The attachment device of claim 8, wherein the fitting is secured to the raised portion through at least one fastener.

20. An attachment device assembly for attaching to a structural component of a building, the attachment device assembly comprising:

an attachment device configured to be attached directly to the structural component, the attachment device including a first plate member including a planar portion having an inner surface configured for abutting a first side of the structural component and the planar portion defining a first fastener opening, and a raised portion extending outward from the planar portion having an inner surface that is spaced outward from the inner surface of the planar portion and an outer surface opposite the inner surface of the raised portion, wherein the raised portion is flanked on at least two sides by the planar portion, and a second plate member configured for engagement with a second side of the structure component opposite the first side, wherein the second plate member defines a second fastener opening alignable with the first fastener opening when the first and second plate members are in engagement with the respective first and second sides of the structural component;

a fastener configured to be received in the first and second fastener openings and through the structural component; and a fitting secured to and engaging the outer surface of the raised portion, wherein the fitting is configured to attach to a sway brace.

* * * * *